Feb. 5, 1929.  1,701,164
R. W. SHAFOR
MIXING APPARATUS AND PROCESS
Filed Feb. 13, 1925  6 Sheets-Sheet 1
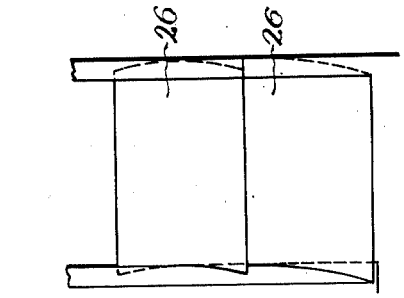
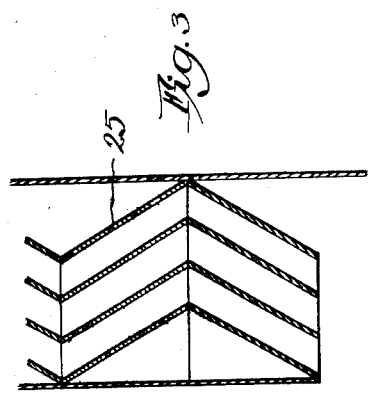
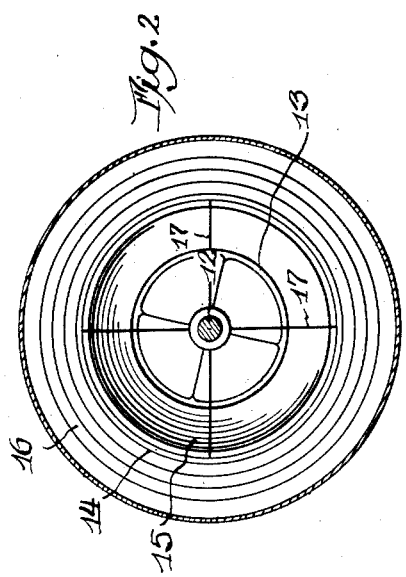
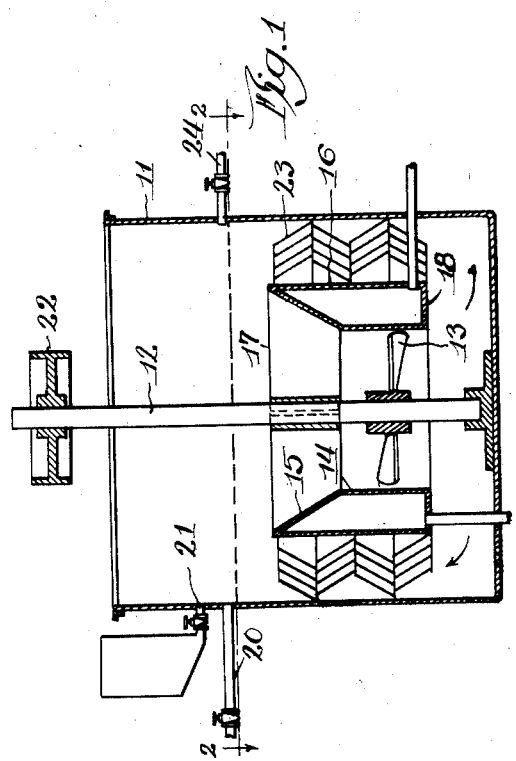

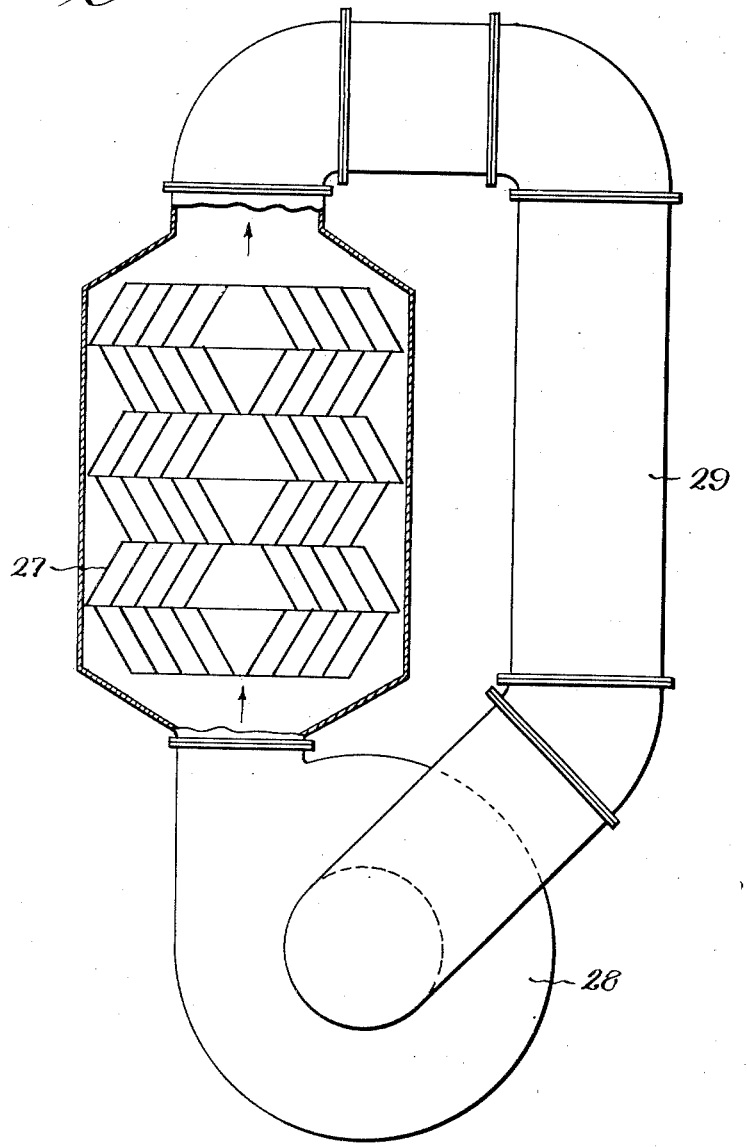

Feb. 5, 1929.
R. W. SHAFOR
1,701,164
MIXING APPARATUS AND PROCESS
Filed Feb. 13, 1925 6 Sheets-Sheet 3
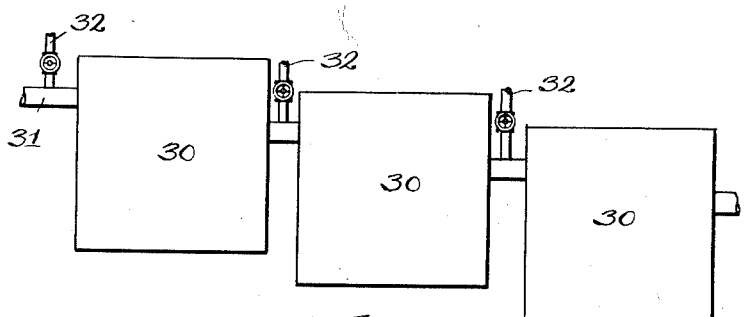
Fig. 6
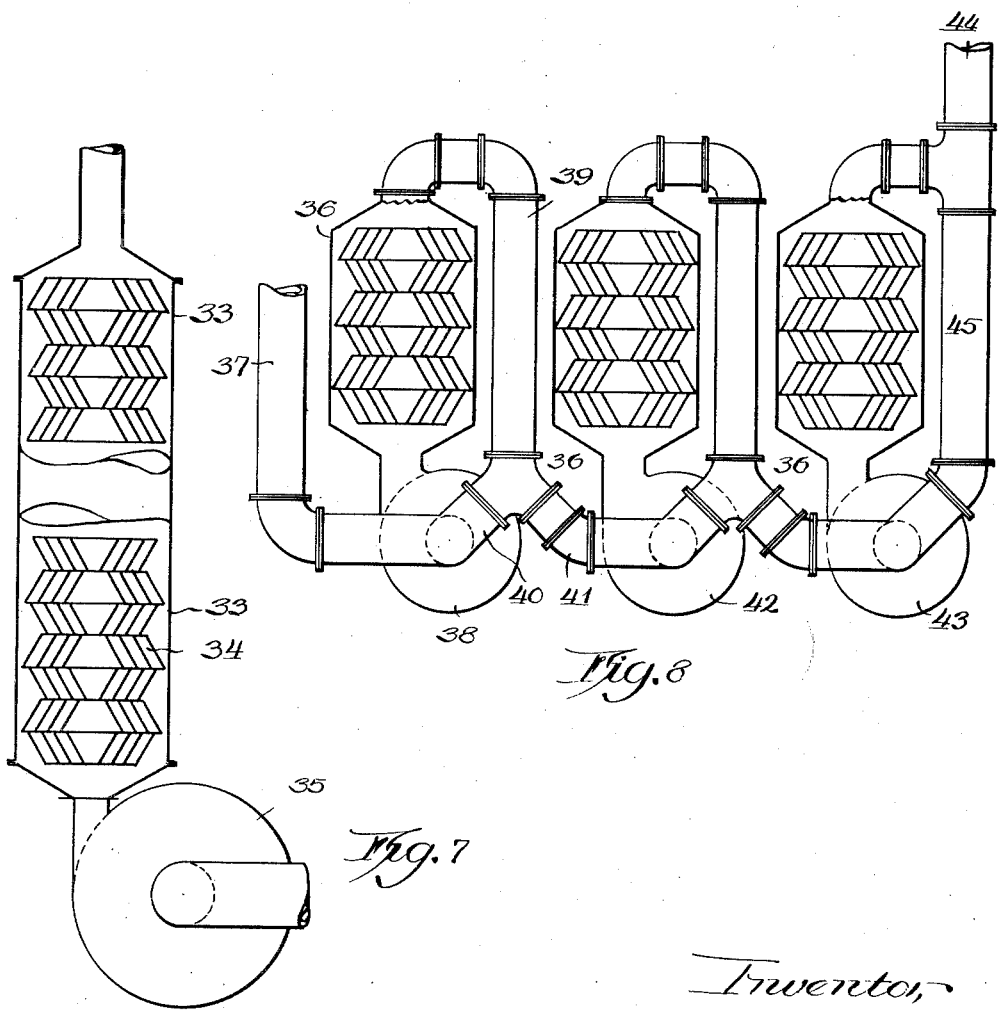
Fig. 8
Fig. 7
Witness:
Chas. R. Koursh.
Inventor,
Ralph W. Shafor,
Atty.

Feb. 5, 1929.

R. W. SHAFOR 1,701,164

MIXING APPARATUS AND PROCESS

Filed Feb. 13, 1925

Feb. 5, 1929.                                                1,701,164
R. W. SHAFOR
MIXING APPARATUS AND PROCESS
Filed Feb. 13, 1925          6 Sheets-Sheet 5
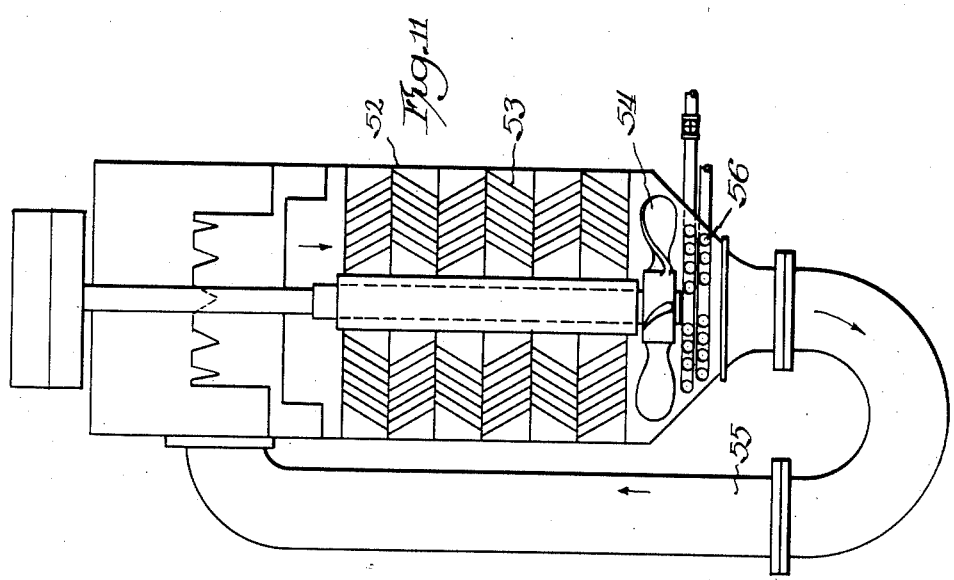
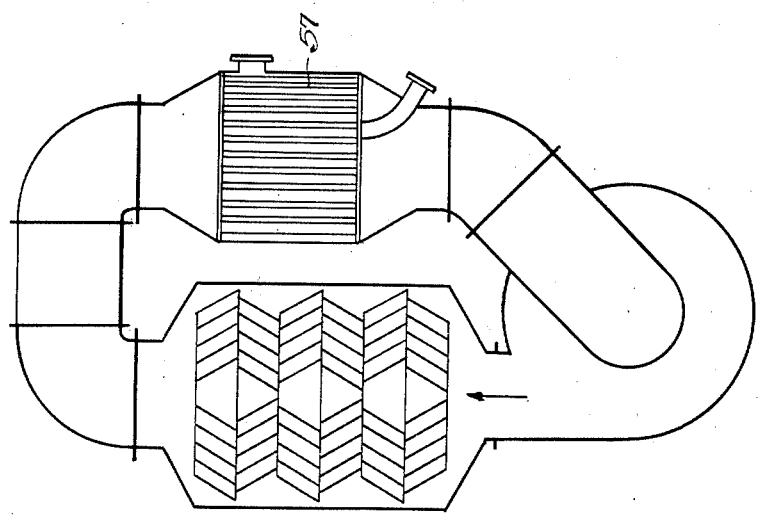

Feb. 5, 1929.
R. W. SHAFOR
1,701,164
MIXING APPARATUS AND PROCESS
Filed Feb. 13, 1925   6 Sheets-Sheet 6
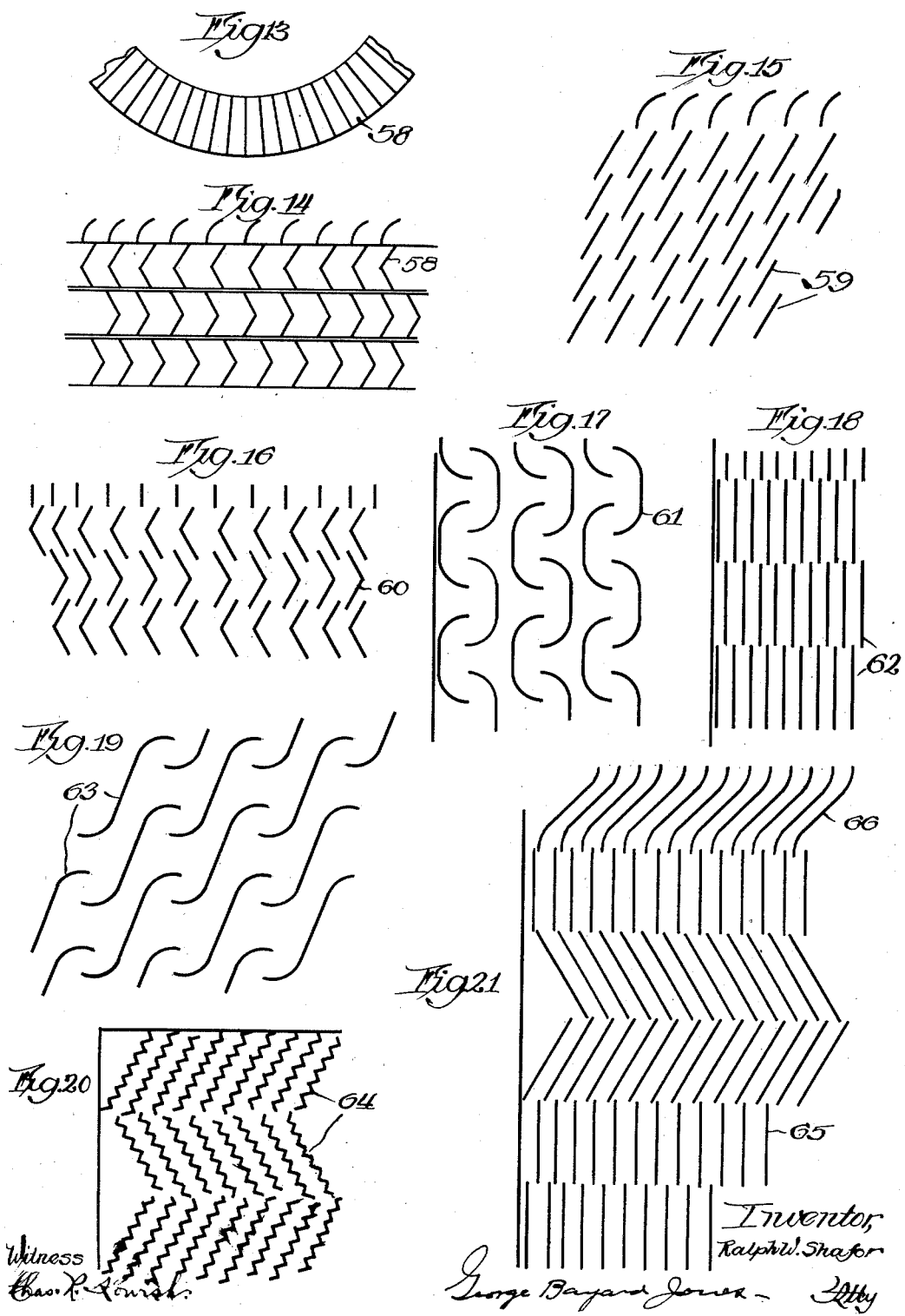

Patented Feb. 5, 1929.

1,701,164

UNITED STATES PATENT OFFICE.

RALPH W. SHAFOR, OF DENVER, COLORADO, ASSIGNOR TO GILCHRIST & COMPANY, OF CHICAGO, ILLINOIS, A CORPORATION OF DELAWARE.

MIXING APPARATUS AND PROCESS.

Application filed February 13, 1925. Serial No. 9,048.

This invention relates to improvements in mixing apparatus and processes used for mixing substances with fluids in the industrial arts, such as liming sugar juices and the like.

One object of the invention is to provide for a more thorough mixing of the fluids and substances than has been attained heretofore.

Another object is to provide means for regulating the temperature of the fluids to any desired value during the mixing, if required.

Other objects will be apparent from a consideration of the description hereinafter given of apparatus for carrying out the invention.

In the accompanying drawings, several embodiments of the invention are illustrated.

Fig. 1 is a vertical sectional elevation of one form of the apparatus.

Fig. 2 is a section on the line 2—2 thereof.

Fig. 3 is an enlarged view of a modified arrangement of baffles.

Fig. 4 is an enlarged view of a further modification in the form of radial baffles.

Fig. 5 is an elevation, partly in section, of a modified form of the apparatus connected to a centrifugal pump.

Fig. 6 is a diagrammatic view of a series of units of such apparatus, one discharging into the next following.

Fig. 7 is a sectional elevation of another modification of the apparatus.

Fig. 8 is a sectional elevation showing a series of apparatus of the type of Fig. 5.

Fig. 11 is a modified apparatus with downward internal flow and upward external flow.

Fig. 12 is another modified apparatus with an external heater in the circulating fluid.

Figure 10:
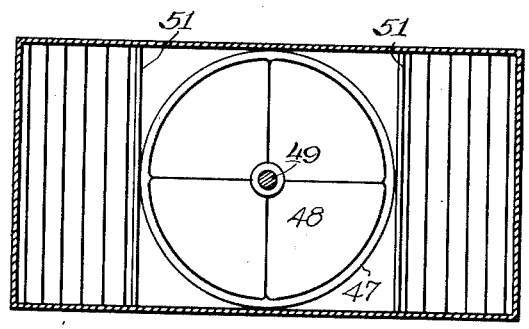
Fig. 10 is a top plan thereof, partly in section.

Figs. 13 to 21, inclusive, are elevations of modified forms of baffles or blades, some of which are stationary and some of which are arranged to rotate as hereinafter described.

Referring to Fig. 1, which is somewhat diagrammatic, there is provided preferably a cylindrical vessel 11 having a vertical shaft 12 mounted centrally therein and provided with a suitable propeller 13 thereon. Said propeller rotates within an inner cylindrical container 14, the upper part of which flares outwardly to provide a funnel shaped inlet 15, the upper part of which joins a cylindrical wall 16. Partitions 17 are shown above the propeller, dividing the inlet into a plurality of separate passageways to prevent excessive rotation of the fluid adjacent the rotating propeller. A chamber is thus formed between the walls 14, 15, 16 and the bottom 18 which may be used as a steam chest or as a cooling means, the purpose of the arrangement being to maintain or to regulate the temperature of the fluid.

The fluid is supplied to the apparatus through any suitable inlet 20, and the substances to be mixed with the fluid through a suitable inlet 21, the fluid mixture being caused to flow downwardly through the cylindrical member 14 by the rotation of the propeller 13, the shaft 12 being driven by any suitable means, such as the pulley 22 located either above or below the apparatus. Said fluid mixture flows downwardly and then spreads out radially near the bottom of the apparatus, and ascends through the annular space formed by the cylindrical wall 16 and the outer wall of the apparatus 11.

To bring about the most thorough mixing and intimate contact of the fluid and the substances to be mixed with the fluid, there is arranged in the said annular space a series of baffles or vanes 23. These baffles are preferably conical and may be arranged in groups and in a plurality of groups, one above the other, as shown. The lowermost group of baffles provides a series of concentric openings into which the fluid flows in an upwardly direction. The group of baffles immediately above the lowermost group may be arranged in such a way that said baffles are at an angle with the baffles of the lowermost group, and, furthermore, may be so arranged that the baffles of the upper group divide the flow from each of the substantially annular spaces formed by the lowermost group of baffles. Owing to the angular arrangement of the groups of baffles with reference to each other, the flow is not only divided, but its direction is changed, as a result of which effective mixing is accomplished. This process of dividing the flow and mixing by change of direction is repeated as many times as there are groups of baffles and baffles in the groups. By dividing the flow from the annular spaces, a portion of the said flow is mixed in its further passage with the flow from the adjoining annular spaces. This arrangement of baffles not only thoroughly mixes liquids but also performs an important function in agitating liquids containing suspended soluble or insoluble matter. Each particle of such matter, when traveling with the liquid in a straight line, will attain approximately the velocity of the liquid and, therefore, the position of each particle with relation to the liquid surrounding it will not be changed thus preventing the surface of this particle from coming into contact with other portions of the liquid. But when this particle is suspended in liquid traveling in a zigzag path, there is a tendency for its rate of travel to lag behind that of the surrounding liquid and also to change its position relative to the surrounding liquid with each change in the direction of flow, due to its higher specific gravity and consequent greater inertia. Thus this mixing apparatus, when used for circulating a liquid with suspended matter in it, causes the liquid to have an average rate of travel definitely greater than the average rate of travel of the suspended matter and so insures thorough contacting of the suspended matter with all portions of the liquid. The conically shaped inlet 15 through which the fluid flows to the propeller assists in avoiding the inclusion of air in the liquid charge. Where such inclusion is not objectionable, the conical structure may be omitted.

The apparatus may be operated either continuously, that is to say, with a continual inflow of the fluid to be treated and of the substance or substances to be mixed with it accompanied by an outflow of the treated material through outlet 24, or it may be operated intermittently. For example, a definite amount of fluid may be drawn into the apparatus, and maintained in circulation, at the same time adding to it the substances to be mixed with it, and only discharging the contents of the apparatus at such time as the mixing is brought to a desired degree.

In Fig. 3 a modified form of baffle is shown in which the groups of baffle plates 25 are not staggered with reference to other groups of baffles, but provide only the feature of change of direction for the ascending currents of fluids, by placing each group at an angle with the one just preceding, the change in direction of flow bringing about the desired degree of mixing.

In Fig. 4, a further modified arrangement is shown in which the baffles 26 are placed radially with reference to the center of the apparatus, and succeeding groups arranged with reference to each other in the same manner as has been described for circumferential baffles.

Fig. 5 is a modification in the apparatus, somewhat diagrammatic, in which the baffles 27 fill the body of the apparatus, and the upward flow is provided for by a centrifugal pump 28, or the like, with an outside return conduit 29.

In Fig. 6 a series of units is provided, each succeeding one being arranged somewhat lower than the preceding one, whereby the liquid entering the highest unit in the series, as at 31, is mixed and treated in the manner described. Thus, a more extensive mixing is accomplished. Additional reagents, or other substances may be added to the mixture, if desired, through valve controlled supply pipes 32 between the tanks.

In Fig. 7 a vertical mixing tank 33 is provided which is relatively high as compared with its diameter, providing for an extended series of baffles 34 therein to insure thorough mixing of the liquid pumped therethrough by the centrifugal pump 35, or other suitable means.

In Fig. 8 a series of mixing tanks 36 is provided. Liquid enters through inlet pipe 37 and is pumped by a centrifugal pump, or other suitable means 38, to the left-hand tank from which it flows downwardly through a pipe 39 and may be divided at the bottom, part being returned to the centrifugal pump by a branch pipe 40 and the remainder passing through a second branch pipe 41 to a second centrifugal pump 42, and so on through the second tank, and thence, in part, to the third tank, through which it is pumped by a third centrifugal pump 43. Part of the liquid passes through the outlet 44 and part returns through the pipe 45 to be re-circulated through the third tank.

Figure 9:
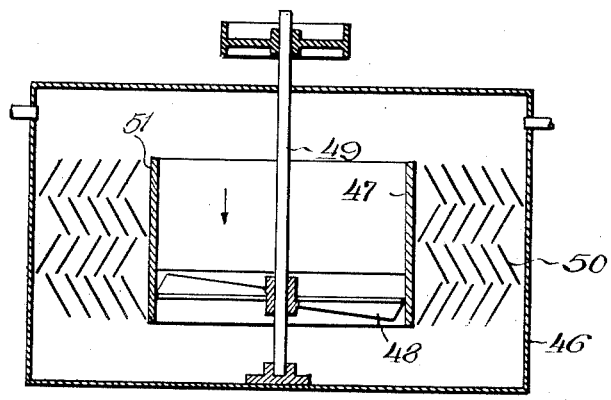
Fig. 9 is a modified apparatus with rectangular tanks.

In Fig. 9 the tank 46 is of rectangular outline instead of being cylindrical, and is provided with an inner cylindrical container 47 having a propeller 48 mounted on a vertical shaft 49, somewhat the same as in the apparatus shown in Fig. 1. The baffle plates 50, instead of being conical, are straight plates arranged in two groups, one at each end of the main tank, and are located within the space between the ends of said main tank and a pair of cross-partitions 51.

The apparatus shown in Fig. 11 comprises a tank 52 with baffles 53 therein, with a propeller or other suitable means 54 to cause the fluid to flow downwardly through the tank and upwardly through an exterior return pipe 55. Means are provided for heating the fluid by means of coils 56 located preferably in the lower part of the tank, as shown, and arranged to be supplied with steam.

In Fig. 12, the apparatus may be of the same character as that shown in Fig. 5, having in addition means for heating the fluid as it flows downwardly through the external conduit, said means comprising a calandria 57 which may be supplied with steam.

Figs. 13 to 21, inclusive, illustrate various modified forms of baffles or blades. In Figs.

13 and 14, the blades 58 are arranged radially in rows, one above the other, alternate rows being fixed and the remaining rows being rotatably mounted, whereby said latter blades, during rotation, effect a thorough mixing of the fluid.

In Fig. 15 the blades 59 may be either stationary or rotatable, and are set at an angle whereby the flow of fluid is directed somewhat helically upwardly near the inner surface of the tank wall.

The blades in the uppermost row are so shaped as to direct the issuing streams of fluid nearly tangentially and horizontally instead of permitting them to flow radially inward. With this arrangement, a sweeping action results, which is very beneficial, the fluid descending into the central chamber in a downward spiral. This same effect may be secured in connection with any of the other arrangements of blades shown herein, either those arranged concentrically or radially.

With the arrangement shown in Fig. 16 the blades 60 are preferably all stationary.

In Fig. 17, curved blades or baffles 61 are provided for directing the liquid back and forth in its passage through said blades.

In Fig. 18 the blades 62 are straight and simply divide the flow.

In Fig. 19 the blades 63 are reversely curved, thereby causing not only a division and mixing of the liquid, but a helical flow thereof around the inner wall of the tank.

In Fig. 20 the blades 64 are corrugated, in addition to being set at an angle to each other, as in some of the prior forms.

In Fig. 21 several different relative arrangements of different groups of blades 65, 66, are shown, including unequal division of the flow by spacing the blades so that less than half of a stream of liquid is diverted to one side of a given blade and more than half to the other side thereof.

Various other forms and arrangements of blades will readily suggest themselves, and the mounting therefor may be either stationary or movable. Where some of the blades are movably mounted, the support therefor may be rotated, whereby the blades may serve also as a propeller to cause the flow of liquid through the apparatus.

With the several different constructions and arrangements of blades described herein, a thorough and progressive mixing or intermingling of the fluid with the desired substance or substances introduced into said fluid is readily effected.

What I claim is:

1. In a mixing tank, in combination a series of baffle plates arranged to provide a plurality of channels for the flow of liquid, the successive baffles being mounted at an angle with the streams of liquid issuing from the preceding channels, whereby the direction of flow of said streams is changed and means for circulating said liquid through said baffles in a substantially closed cycle to insure thorough mixing thereof.

2. In a mixing tank, in combination, a series of baffle plates arranged to provide a plurality of channels for the flow of liquid, the successive baffles being mounted to direct the streams of liquid alternately back and forth at a substantial angle to their main line of flow and means for circulating said liquid through said baffles in a substantially closed cycle to insure thorough mixing thereof.

3. In a mixing tank, in combination, a series of baffle plates arranged to provide a plurality of channels for the flow of liquid, the successive baffles being mounted to divide the streams of liquid issuing from the preceding channels and combine part of one stream with part of another.

4. In a mixing tank, in combination, a series of baffle plates comprising individual groups, the plates of one group being arranged at an angle to the plates of the next group and offset therefrom to divide the streams of liquid as they flow from one group to the next group and to change the direction of flow thereof through each group.

5. In a mixing tank, in combination, a series of baffle plates comprising individual groups, the plates of one group being arranged at an angle to the plates of the next group and offset therefrom to divide the streams of liquid as they flow from one group to the next group and to change the direction of flow thereof through each group, and means for forcing said liquid through said baffles and returning the same in a substantially closed cycle.

6. A mixing tank having a wall therein providing a chamber with a space between said chamber and the wall of said tank, a propeller mounted in said chamber, and a series of baffles arranged in said space; said baffles being mounted to divide the stream of liquid into a series of streams, each of which is further divided and intermingled with an adjacent stream during its flow, all of said streams being reunited in a common stream.

7. In a mixing tank, a conduit mounted therein, a sharply converging tapered inlet on the upper end of said conduit, a wall generally spaced from said inlet and conduit forming therewith an annular chamber, means for varying the temperature in said chamber, baffles in said tank radially outside of said conduit for forming separate streams of liquid and adapted to abruptly change repeatedly the direction of the flow of said streams, and means for forcing liquid through said conduit and baffles.

8. A mixing apparatus comprising a tank, a conduit mounted within said tank and spaced apart from the walls of said tank, an agitator adapted to force liquid through said conduit, and a series of baffles radially outside of said conduit arranged to form channels for streams of liquid and to repeatedly change the direction of said streams.

9. In a mixing tank, in combination, a series of baffle plates arranged to provide a plurality of channels for the flow of liquid, the successive baffles being mounted to divide the streams of liquid issuing from the preceding channel and combine part of one stream with part of another, and means for regulating the temperature of said liquid.

10. Mixing apparatus comprising means for causing a circulation of liquid in a closed cycle, means for dividing the stream of liquid into a plurality of smaller streams during such flow, combining part of one stream with part of another, causing said combined smaller streams to intermingle in a common larger stream, and means for imparting a rotary motion to said common larger stream.

11. The method of producing a thorough and progressive mixing of liquid comprising causing a circulation of said liquid in a closed cycle, dividing the stream of liquid into a plurality of smaller streams during such flow, combining part of one stream with part of another, and causing said combined smaller streams to unite in a common larger stream.

12. The method of producing a thorough and progressive mixing of liquid comprising causing a circulation of said liquid in a closed cycle, dividing the stream of liquid into a plurality of smaller streams during such flow, changing the direction of flow of said smaller streams, combining part of one stream with part of another, and causing said combined smaller streams to unite in a common larger stream.

13. The method of producing a thorough and progressing mixing of liquid comprising causing a circulation of said liquid in a closed cycle, dividing the stream of liquid into a plurality of smaller streams during such flow, combining part of one stream with part of another, causing said combined smaller streams to unite in a common larger stream, and regulating the temperature of said liquid during such circulation.

14. The method of producing a thorough and progressive intermingling of liquid comprising causing a circulation of said liquid in a closed cycle, dividing the stream of liquid into a plurality of smaller streams during such flow, combining part of one stream with part of another, causing said combined smaller streams to unite in a common larger stream, regulating the temperature of said liquid during such circulation, and imparting a rotary motion to said common larger stream.

15. In a mixing apparatus adapted to circulate in a closed cycle a portion of the liquid in a single continuous body of liquid, a tank, an open ended conduit mounted in said tank, means for forcing a stream of liquid through said conduit, and means interposed in the path of said liquid between its exit from said conduit and its re-entry into said conduit for repeatedly changing the direction of flow of said liquid and for conducting said liquid in a plurality of streams separated from each other at various places and for various distances.

16. In a mixing apparatus, groups of baffles, each group comprising a plurality of truncated cones, the cones in each group being inverted with respect to the cones in the adjacent groups, the baffles thus forming channels for conducting a plurality of streams of liquid and adapted to repeatedly and abruptly change the direction of said streams.

17. In a mixing apparatus, groups of baffles, each group comprising a plurality of truncated cones, the cones in each group being inverted with respect to the cones in the adjacent groups, the edges of the cones in adjacent groups being staggered to provide a plurality of channels for conducting streams of liquid and for dividing the streams issuing from one group as said streams pass into the next adjacent group.

18. A mixing apparatus comprising a tank, a conduit vertically aligned therein, groups of baffles disposed between the exterior of said conduit and the walls of said tank, each group comprising a plurality of truncated cones, the cones in each group being inverted with respect to the cones in the adjacent groups, the baffles thus forming channels for conducting a plurality of streams of liquid and adapted to repeatedly and abruptly change the direction of said streams, and means for forcing a liquid through said conduit and through said baffles to cause violent and thorough agitation of said liquid.

19. In a mixing apparatus, a tank, an open ended conduit in said tank, a sharply converging inlet on the upper end only of said conduit extending a relatively short distance of the height of the conduit, and means including an impeller for forcing a stream of liquid downwardly through said inlet and conduit and thence from the outlet end of said conduit back again into the inlet end of said conduit, the flow through said inlet end being adapted to prevent inclusion of air with the liquid, the recirculation through said conduit effecting thorough agitation of the liquid.

20. In a mixing apparatus, a tank, a vertically aligned conduit, a sharply converging conical inlet on the upper end of said conduit, means for causing a flow of liquid downwardly through said inlet and conduit thereby preventing the inclusion of air with said flow, and means in said tank outside of said conduit for directing upwardly the liquid discharge from said conduit an for further agitating said liquid during its upward flow by frequent changes of direction of flow, the inlet, the conduit and the means for causing a flow therethrough being entirely submerged in the liquid being mixed.

21. In a mixing apparatus, a tank, a vertically aligned conduit, a sharply converging conical inlet on the upper end of said conduit, means for causing a flow of liquid downwardly through said inlet and conduit thereby preventing the inclusion of air with said flow, means in said tank outside of said conduit for directing upwardly the liquid discharge from said conduit and for further agitating said liquid during its upward flow by frequent change of direction of flow, the inlet, the conduit and the means for causing a flow therethrough being entirely submerged in the liquid being mixed, and means disposed about said conduit for regulating the temperature of liquid passing through the conduit.

22. In a mixing apparatus, a tank, a vertically aligned conduit, a sharply converging conical inlet on the upper end of said conduit, means for causing a flow of liquid downwardly through said inlet and conduit thereby preventing the inclusion of air with said flow, and means in said tank outside of said conduit for directing upwardly the liquid discharge from said conduit and for further agitating said liquid during its upward flow by frequent change of direction of flow the inlet conduit and the means for causing a flow therethrough being entirely submerged in the liquid being mixed said conduit being provided with an annular chamber for varying the temperature of liquid passing through said conduit adjacent to said chamber.

23. In a mixing apparatus, a series of baffles adapted to divide a stream of liquid into a plurality of streams, to conduct said streams separately from each other for a substantial distance, to thereafter unite portions of two of said streams into one stream, and thereafter divide said one stream into a plurality of streams.

24. In a mixing apparatus, a series of baffles adapted to divide a stream of liquid into a plurality of streams, to conduct said streams separately from each other for a substantial distance, to thereafter unit fractions of two of said streams into one stream, to thereafter divide said one stream into a plurality of streams, and to violently agitate said liquid during its passage through said baffles by abruptly changing the direction of said streams a plurality of times.

25. The method of producing a progressive mixing of a liquid comprising causing the flow of a stream of the liquid, dividing said flowing stream into a plurality of smaller streams, conducting each smaller stream for a substantial distance separated from the other streams, thereafter subdividing a plurality of said smaller streams and uniting a subdivided portion of each stream with a subdivided portion of another stream, conducting these streams of united portions separately from other streams, and subsequently reuniting a plurality of said streams into a common large stream.

26. The method of producing a progressive mixing of a liquid comprising causing the flow of a stream of the liquid, dividing said flowing stream into a plurality of smaller streams, conducting each smaller stream for a substantial distance separated from the other streams, thereafter subdividing a plurality of said smaller streams and uniting a subdivided portion of each stream with a subdivided portion of another stream, conducting these streams of united portions separately from other streams, subsequently re-uniting a plurality of said streams into a common large stream and changing the direction of flow of the liquid repeatedly during the foregoing operations.

In testimony whereof, I have subscribed my name.

RALPH W. SHAFOR.